Feb. 15, 1938. W. T. BROWN 2,108,578
APPARATUS FOR THE TREATMENT OF FIBERS
Filed Jan. 24, 1936 4 Sheets-Sheet 1
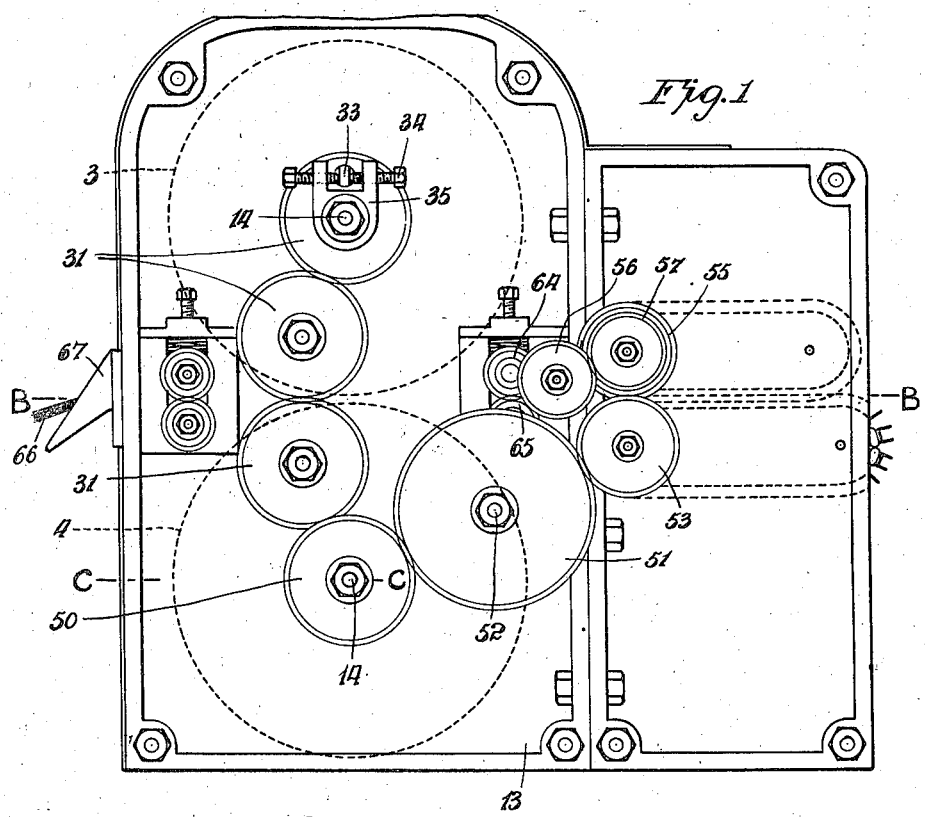
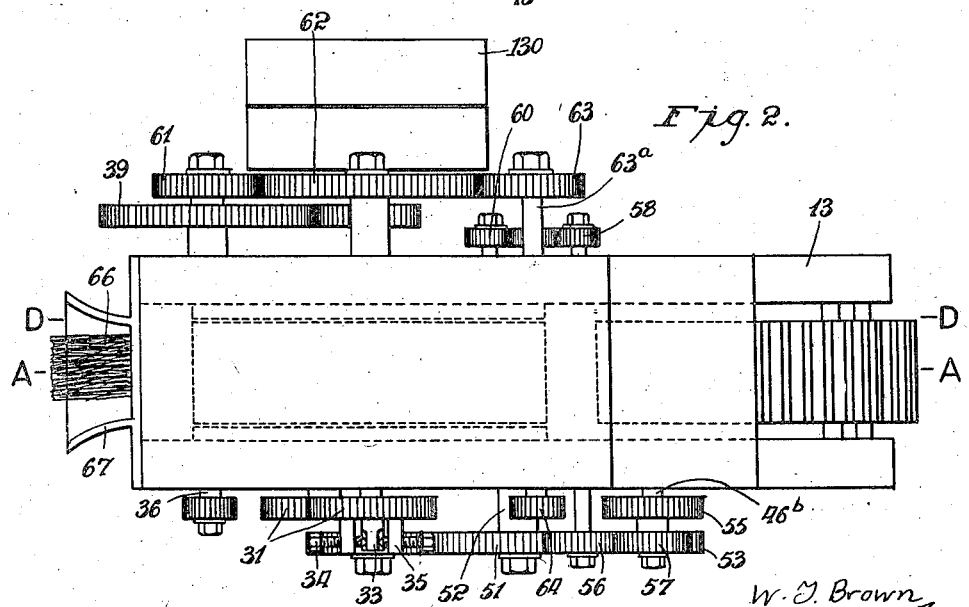

Feb. 15, 1938.   W. T. BROWN   2,108,578
APPARATUS FOR THE TREATMENT OF FIBERS
Filed Jan. 24, 1936   4 Sheets-Sheet 2

W. T. Brown, INVENTOR

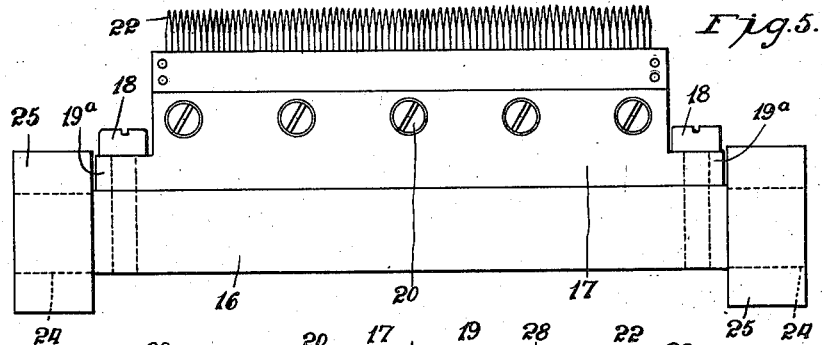
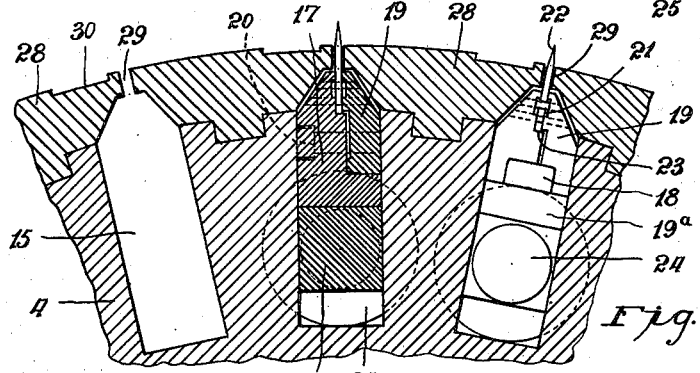
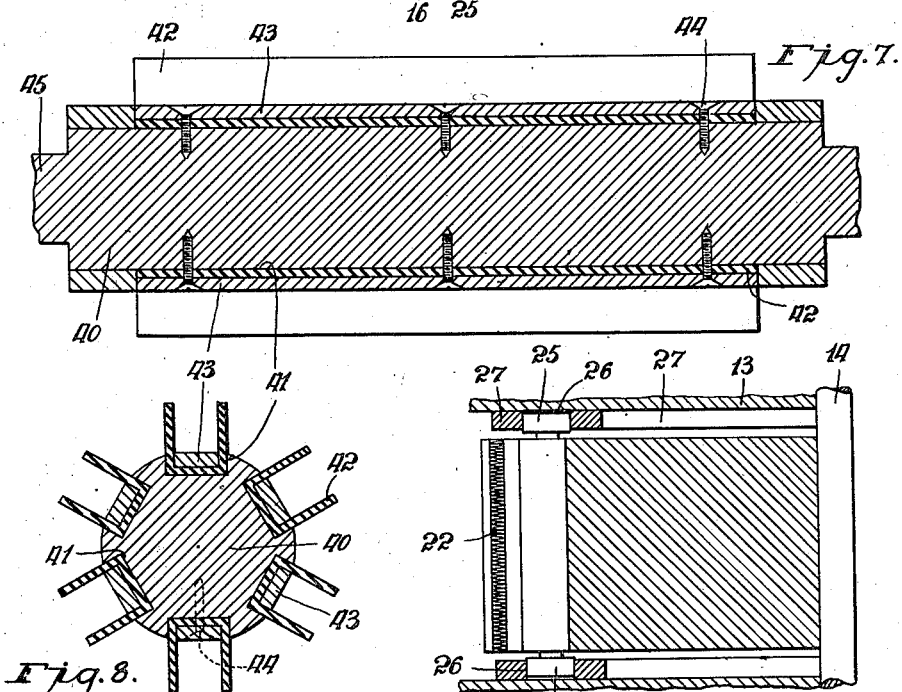

Feb. 15, 1938.　　　　W. T. BROWN　　　　2,108,578
APPARATUS FOR THE TREATMENT OF FIBERS
Filed Jan. 24, 1936　　　4 Sheets-Sheet 4
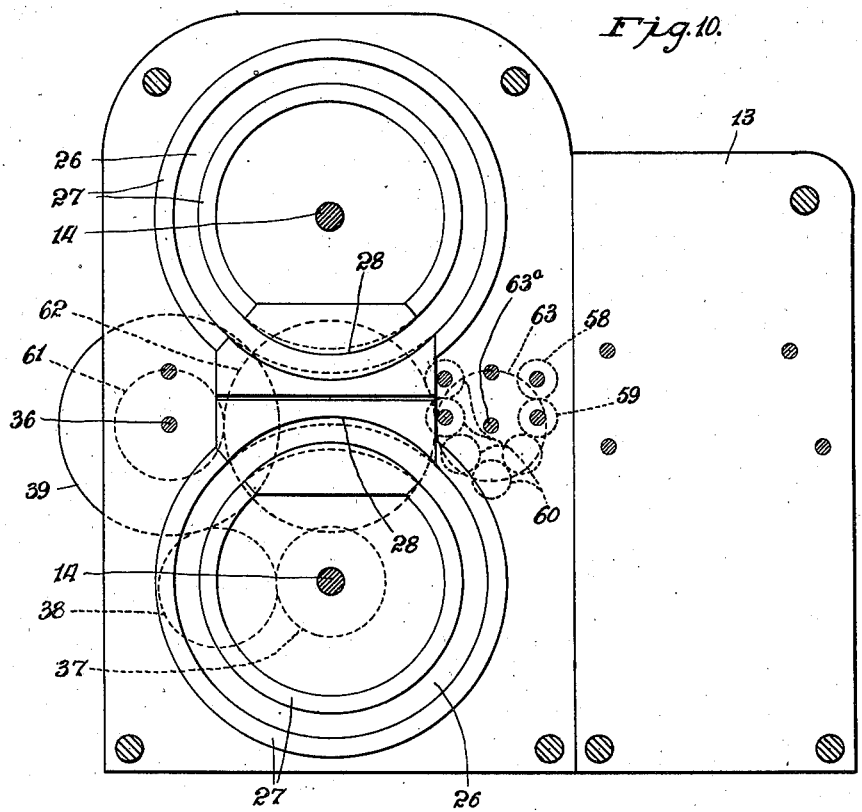
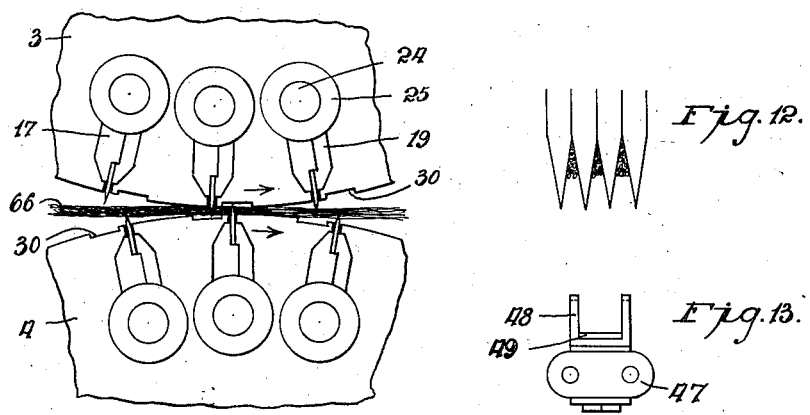
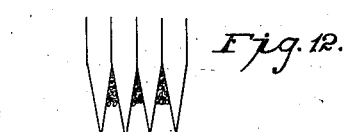
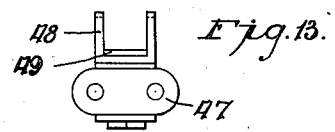
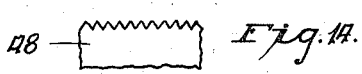
W. T. Brown
INVENTOR
By Glascock Downing & Seebold Attys Patented Feb. 15, 1938

2,108,578

UNITED STATES PATENT OFFICE 2,108,578

APPARATUS FOR THE TREATMENT OF FIBERS

William Thomas Brown, Wellington, New Zealand, assignor to Fibre Processing Limited, Wellington, New Zealand, Incorporated Company of New Zealand Application January 24, 1936, Serial No. 60,728
In New Zealand January 31, 1935

8 Claims. (Cl. 19—29)

This invention relates to apparatus for separating the fiber from New Zealand flax (*Phormium tenax*) and other fiber bearing plants.

The object of the invention is to obtain fiber of fine quality and of long staple.

According to the present invention, a pair of rotating drums to which the leaf is fed are provided with transverse stripping combs arranged at intervals on their circumferential periphery. These combs consist of a number of needle-like points set close together and adapted to pierce and cut longitudinally through the leaf and separate the fibers during their passage through the leaf.

The needles are conically pointed so that a tapered space is left between them. The drums rotate in different directions so that their adjacent moving peripheries are traveling in the same direction; the needles of a comb on one drum follow closely the needles of a comb of the opposing drum, and are in alignment therewith, and so provide a continuous longitudinal severing of the leaf into strips, which, entering the tapered space between the needles, are stripped and broken up so as to separate the fibers from each other and from the vegetable matter.

The invention will be described with the aid of the accompanying drawings, wherein:—

Figure 1 is a side elevation.

Figure 2 is a plan.

Figure 5 is an elevation of the comb, and

Figure 6 is a sectional elevation through a part of the drum showing a comb in section and a comb in elevation in position.

Figure 7 is a sectional elevation through a licking roller.

Figure 8 is a cross section of the roller shown in Figure 7.

Figure 9 is a sectional plan taken on line C—C Figure 1, but drawn to a slightly larger scale.

Figure 10 is an elevation of the inner side of the frame of the machine in order to show the cam races, this view being taken on line D—D Figure 2.

Figure 11 is a view showing the relative working position of the combs on the opposing drums.

Figure 12 is an enlarged view of the needles showing the fiber between them.

Figure 13 is a view of the link of the washing conveyor.

Figure 14 is a view showing the edge of the vane of the washing conveyor.

Figure 3:
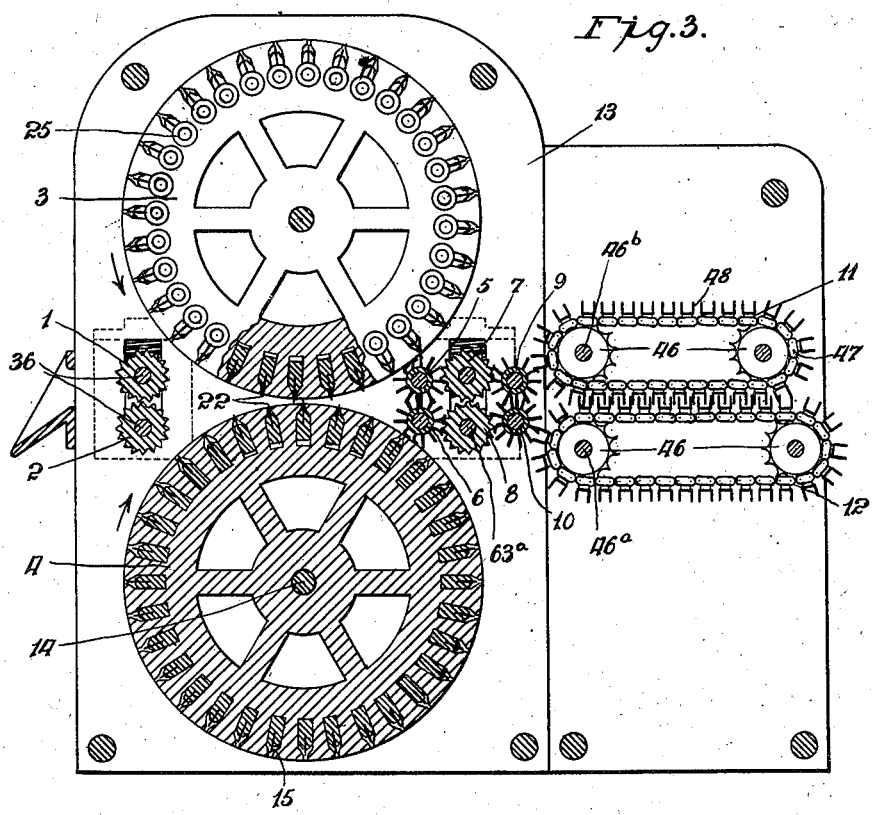
Figure 3 is a sectional cross elevation on line A—A Figure 2.

Referring to the drawings, the general assembly of the machine consists of feed-rollers 1 and 2, stripping drums 3 and 4, licking rollers 5 and 6, further feed rollers 7 and 8, licking rollers 9 and 10, and washing conveyors 11 and 12, all the rotating parts being mounted on shafts or spindles journalled in the side members of a frame 13 and driven by gearing. The path of the leaf is first between the feed rollers 1 and 2, then between the stripping drums 3 and 4, licking rollers 5 and 6, feed rollers 7 and 8, licking rollers 9 and 10, and conveyors 11 and 12.

The construction of the drums 3 and 4 will now be described in detail. Each drum is mounted on its shaft 14 and consists of a body having a number of radial slots 15 traversing its circumferential periphery. These slots are spaced equally apart and receive comb blocks (see Figures 5 and 6) which have radial sliding movement in the slots. Each comb block is built up of a carrier 16 to which is secured one part 17 of a needle clamp by means of studs 18 passing through the end flanges 19ª into the carrier 16. The block is completed by another needle clamp member 19, these two parts being secured by studs 20. These two clamping portions 17 and 19 are fitted so that a space 21 will be provided between them to receive a number of needles 22 to complete the comb. These needles preferably consist of the usual type of gramophone needle, and are inserted in position in the space 21 between the two parts and bear one against the other, the height of the point being regulated by a shoulder 23 on the clamping portion 17. A great number of stripping points are thus provided. On the periphery of the drum segments 28 are secured and spaced so as to leave slots 29 through which the needles project. These segments have transverse channels 30 into which the needles, when projected, enter at the stripping position. Each end of the carrier 16 is turned to form a spindle end 24 on which is placed a roller 25 which runs in a race 26 (see Figures 9 and 10) formed on the inner side of the frame by means of ring-like members 27 secured to the frame by studs or the like. The race 26 is concentric with the drums during the greater portion of its length, but at a position opposite the stripping operation, the race has its arc of lesser radius to form a cam surface 28. The difference between this cam surface and the remainder of the race is indicated by the dotted lines in Figure 10. This cam surface 28 will project the combs outwards from the drum during this portion of their travel, but during the remainder of their travel the combs are retracted by the remainder of the race so that the needle points 22 are just below the circumferential surface of the drums (see Figure 3). The shafts 14 of the drums extend through the frame, being mounted in suitable bearings therein (not shown), the lower drum 4 being driven from a suitable source of power by means of a belt pulley 130 and the upper drum 3 from the shaft of the lower drum by a train of gears 31, as shown in Figure 1. The gear 31 on the shaft of the upper drum 3 is free on its shaft, but its relation thereto is adjustable by means of a pin 33 projecting from the gear and held in an adjusted position by set screws 34 in a bracket 35 fixed on the end of the drum shaft 14. By these means the lateral distance between the needles on the lower drum and the needles on the upper drum can be adjusted.

Figure 4:
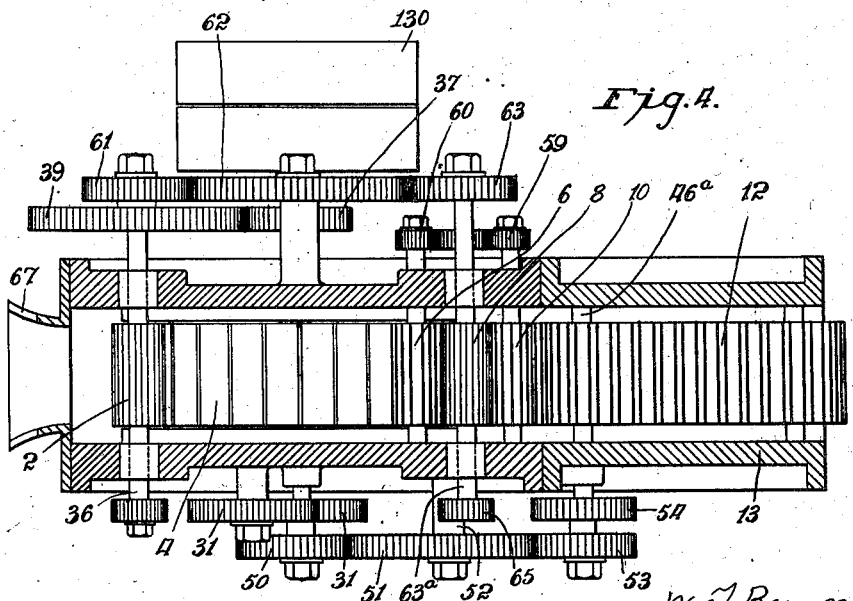
Figure 4 is a sectional plan on line B—B Figure 1.

Immediately in front of the drums 3 and 4 are the feed rollers 1 and 2. These are fluted in a well known manner, and are mounted on shafts 36 mounted in suitable bearings in the frame, and driven by a gear 37 on the shaft of the drum 4 and meshing with an idler 38 (shown in dotted lines in Figure 10) in turn meshing with a gear 39 fixed on the shaft 36 of the lower feed roller (see Figures 2, 4, and 10).

On the other side of the drums are placed the licking rollers 5 and 6, these being shown in detail in Figures 7 and 8, and consist of a shaft 40 having longitudinal channels 41 spaced around its periphery, in which are placed moulded strips of rubber 42 of channel section and held in position by plates 43 through which pass screws 44 for retaining the rubber in position. A number of flexible vanes are thereby provided. The ends of the shaft are reduced into spindles 45 which are set in bearings in the frame and are driven through the medium of gears on the exterior of the frame, as hereinafter described. The function of these rollers is to prevent the fiber being carried around on the drum by reason of the adhesive nature of the moist fiber, and the rubber vanes wiping against the face of the drums will also remove excess vegetable matter from them and prevent any clogging effect. They will carry the fiber between them to the feed rollers 7 and 8.

The other pair of licking rollers 9 and 10 is placed on the other side of the feed rollers 7 and 8, and performs a similar function on the teeth of these feed rollers as the licking rollers 5 and 6 perform on the drums 3 and 4. They also carry the fiber to the washing conveyors 11 and 12.

The washing conveyors 11 and 12 consist of sprocket wheels 46 spaced apart, having a sprocket chain 47 running over them and carrying a number of rubber wiping or licking vanes 48 attached to the chain by plates 49 so as to assume the same channel section as the rubber vanes 42, but having serrated edges (see Figure 14). These conveyors are arranged to travel at a greater speed than the feed rollers, and carry forward the fiber and retain the fiber in a straight or elongated form, at the same time washing and removing the vegetable matter from the fiber and giving a scrubbing effect thereto. Water would be brought to play upon the conveyors so as both to lubricate the rubber and to wash away stripped matter from the fiber.

The licking rollers and conveyors 11 and 12 are driven from a gear 50 (Figures 1 and 4) on the shaft 14 of the drum 4, meshing with an idler 51 on a stub spindle 52 projecting from the frame, this idler meshing with a gear 53 on the spindle 46$^a$ of a sprocket 46 of the lower conveyor 12. The upper conveyor 11 is driven from a gear 54 (see Figure 4) on the spindle 46$^a$ and meshes with a gear 55 (Figures 1 and 2) on the spindle 46$^b$ of the sprocket wheel 46 of the upper conveyor. The licking roller 9 is driven from a gear 56 on its spindle, meshing with a gear 57 on the spindle 46$^b$. The licking roller 10 is driven by a gear 58 (see dotted lines in Figure 10) on the other end of the spindle of roller 9 and meshing with a gear 59 on the spindle of roller 10. The rollers 5 and 6 are driven by a train of gears 60 from gear 59.

The feed rollers 7 and 8 are driven by means of a gear 61 on the spindle of feed roller 2 through the medium of an idler 62 (Figures 4 and 10), which meshes with a gear 63 on the spindle 63$^a$ of feed roller 8, while the roller 7 is driven by a gear 64 (Figures 1 and 2) from a gear 65 on the spindle 63$^a$.

In operation, the leaf 66 (see Figure 11) is entered into the mouth 67 where it is immediately caught by the fluted feed rollers 1 and 2 and entered between the two drums 3 and 4. These are travelling in the direction of the arrow in Figures 3 and 11, the peripheral speed being greater than that of the feed rollers. The leaf during its travel between the drums is pierced and divided by the needles which pass through the leaf, this piercing being secured by means of the channels 30 in the drum (see Figure 11). The parallel movement divides the leaf without, however, destroying the cross section of the fibers. The strips of the leaf which have been severed by the points of the needles 22 and which contain a number of fibers, are then forced or wedged into the angular space between the needles, where the frictional or scrubbing effect divides and breaks up or separates the strip into its fine parts and separates the vegetable matter from the fibers.

As the fibers pass the stripping position, any fiber that tends to follow the combs on to the periphery of the drums is licked off by means of the rubber vanes 42 and carried between them which ensures the continuous fibers being entered between the feed rollers 7 and 8. As the fibers pass out of the feed rollers 7 and 8, the rollers 9 and 10 prevent any fiber being carried around the periphery of the feed rollers 7 and 8, and ensures the fiber passing between these licking rollers to the washing conveyors 11 and 12, the action of the rubber vanes on the latter being to straighten and wash away the vegetable matter which has been freed from the fiber during its passage through the combs.

By altering the distance between the needles of a lower and upper drum by means of the set screws 34, the fineness of the fiber can be varied.

The retraction of the needles 22 into the slots 29 clears the needles of vegetable matter which would otherwise collect and adhere to the needles and interfere with their operation.

What I claim is:—

1. An apparatus for treating New Zealand flax and the like fibrous plants, a pair of stripping drums rotatable at high speed, with their opposing peripheries travelling in the same direction, a pair of feed rollers on the entrance and exit side of the drums, the peripheries of said feed rollers travelling at a less speed than that of the stripping drums, the opposing peripheries of the stripping drums set so as to retain the leaf firmly between them, but allow the required slipping, transverse combs on the drums containing a number of needle-like points set close together, the needle-like points of the combs of one drum set to travel immediately behind the needle-like points of the combs of the other drum, the needle-like points of the combs of each drum being in alignment and in alignment with the needle-like points of the other drum, transverse channels in the drums immediately in front of the combs in one drum, and immediately behind the combs in the other drum, said channels being separated from said combs, so that the needle-like points can completely pierce the leaf.

2. In an apparatus for treating New Zealand flax and the like fibrous plants, a pair of drums, means for rotating said drums, combs consisting of a plurality of conically pointed needles set close together so that a tapered space is left between the needles at their pointed ends, said combs being placed transversely on the drum circumference, the comb of one drum arranged to operate immediately behind the comb of the other drum, the needles of each comb on one drum arranged in circumferential alignment with the needles of the other combs and with the needles of the combs of the other drum, transverse channels in the drums to permit the needles of each drum to assume a position during the stripping operation below the normal periphery of the opposing drum in order to completely pierce the leaf.

3. In apparatus for treating New Zealand flax and the like fibrous plants, a pair of feed rollers, a pair of stripping drums, means for rotating said rollers and said drums, the periphery of said drums set at a distance so as to grip the leaf but allow sufficient slipping and travelling at a higher speed than the feed rollers, combs consisting of a plurality of conically pointed needles set close together, so that a tapered space is left between the needles at their pointed ends, said combs placed transversely on the drum circumference, the comb of one drum arranged to operate immediately behind the comb of the other drum, the needles of each comb on one drum arranged in circumferential alignment with the needles of the other combs, and with the needles of the combs of the other drum, transverse channels in the drums between the combs so that the needles of each drum can, during the stripping operation, assume a position below the normal periphery of the opposing drum in order to completely pierce the leaf and sever it into longitudinal sections, which enter the tapered spaces where the fibers are finally separated.

4. In apparatus for treating New Zealand flax and the like fibrous plants, a pair of rotating drums, transverse stripping combs arranged at intervals on the circumference of said drums, said combs consisting of a number of needle-like points set close together and adapted to pierce and pass longitudinally through the leaf and separate the fibers, licking rollers on the exit side of the drums, said licking rollers consisting of shafts having longitudinal channels to receive U shaped rubber vanes and clamping plates to retain the vanes in position, said vanes adapted to wipe the periphery of the drums and feed rollers.

5. In the apparatus as claimed in claim 1, the needles arranged so that their points are normally below the surface of the drums, but to be projected beyond the peripheral surface of the drum during the stripping operation.

6. In the apparatus as claimed in claim 1, the circumferential periphery of the drums having radial slots in which said comb members are slidable and means to retain the combs within the slots so that the points are below the normal periphery of the drums during the major portion of their movement, but to project them outwardly at the stripping position.

7. In the apparatus as claimed in claim 1, said comb members formed of a carrier portion, and needle clamping portions fixed to said carrier portion.

8. In the apparatus as claimed in claim 1, the circumferential periphery of the drums having radial slots in which said comb members are slideable, rollers on the ends of the comb members, a cam race in the frame opposite each end of the drum in which race the rollers travel.

WILLIAM THOMAS BROWN.